US007002919B1

(12) United States Patent
El-Sayed

(10) Patent No.: US 7,002,919 B1
(45) Date of Patent: Feb. 21, 2006

(54) METHOD AND SYSTEM FOR GUARANTEEING QUALITY OF SERVICE FOR VOICE-OVER-IP SERVICES

(75) Inventor: Mohamed Lotfy El-Sayed, Monmouth, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 757 days.

(21) Appl. No.: 09/639,737

(22) Filed: Aug. 16, 2000

(51) Int. Cl.
*H04L 12/56* (2006.01)
*H04L 12/66* (2006.01)
*H04M 7/00* (2006.01)

(52) U.S. Cl. .................. 370/252; 370/356; 370/395.21; 370/395.41; 370/395.43; 370/395.64; 379/88.17

(58) Field of Classification Search ................ 370/352, 370/353, 395.5, 395.52, 230, 395.2, 252, 370/356, 395.21, 395.41, 395.43, 395.64; 379/88.17
See application file for complete search history.

(56) References Cited

U.S. PATENT DOCUMENTS

| | | | | |
|---|---|---|---|---|
| 5,392,344 A | * | 2/1995 | Ash et al. ............... | 379/221.07 |
| 5,519,689 A | * | 5/1996 | Kim ........................... | 370/232 |
| 5,781,624 A | * | 7/1998 | Mitra et al. ................. | 379/244 |
| 6,092,113 A | * | 7/2000 | Maeshima ................... | 709/230 |
| 6,434,624 B1 | * | 8/2002 | Gai et al. .................... | 709/232 |
| 6,574,195 B1 | * | 6/2003 | Roberts ....................... | 370/235 |
| 6,584,110 B1 | * | 6/2003 | Mizuta et al. ............... | 370/401 |
| 6,590,867 B1 | * | 7/2003 | Ash et al. .................... | 370/236 |
| 6,614,781 B1 | * | 9/2003 | Elliott et al. ................ | 370/352 |
| 6,724,722 B1 | * | 4/2004 | Wang et al. ................. | 370/229 |
| 6,778,494 B1 | * | 8/2004 | Mauger ....................... | 370/230 |
| 6,778,535 B1 | * | 8/2004 | Ash et al. ............. | 370/395.21 |
| 6,801,502 B1 | * | 10/2004 | Rexford et al. ............. | 370/235 |

* cited by examiner

*Primary Examiner*—Alpus H. Hsu

(57) ABSTRACT

A method and system are disclosed for providing voice communication over a packetized network in which quality of service is guaranteed for voice communications. The method involves identifying reserved paths within the network, such as multi-protocol label switching paths. When a call is made, the identified reserved paths are evaluated to determine whether each contains sufficient bandwidth for the requested voice communication. The effective bandwidth for the call is estimated based on the codec used for the call, the service class parameter set from the caller's user profile, the time of day, and other parameters. A priority parameter is set for the requested voice communication, which may be based on the service class parameter, and is mapped to a specific Differentiated Service Code Point (DSCP) and 802.1p service class parameter. If the reserved path is determined to contain sufficient bandwidth, the requested voice communication is transmitted over the reserved path at the set priority. If the path does not contain sufficient bandwidth, an error message is sent to inform the caller that QoS can not be guaranteed for the call, and a decision is made whether the call should proceed nevertheless.

11 Claims, 6 Drawing Sheets

METHOD AND SYSTEM FOR GUARANTEEING QUALITY OF SERVICE FOR VOICE-OVER-IP SERVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates to voice-over-IP services and, more particularly, to improved methods for ensuring quality of service for voice communications using such services.

Packet telephony are services for providing voice traffic capabilities over a network, such as the Internet, a wide area network, an intranet, or a local area network, in which data is transmitted in packets. Voice-over-Internet Protocol ("VoIP") services is a type of packet telephony in which the packets are carried by a network employing an IP routing protocol for routing traffic over the network. Current voice-over-IP services establish voice calls over data backbone networks by packetizing voice traffic into IP packets and transmitting them over the networks. Calls are first accepted based on a user profile and, once the destination is selected, all voice traffic is packetized in IP and transmitted.

In some VoIP systems, a gateway takes the voice communication from a traditional PBX or telephone switch, compresses it, packetizes it, converts it to IP format and routes it across the network to the destination. Another gateway at the destination receives the IP packet and reverses the operation to convert it back into the format needed for transmission to the receiving phone system. The gateways may be implemented as special hardware boxes or devices or as software modules running on network servers. The gateways work with gatekeeper devices or systems to identify the destination gateway and IP address of the identified recipient of the voice communication. Gatekeepers administer packet telephony call control and management, and administer call sessions to decide whether and how much bandwidth is dedicated to each requested communication.

For a voice call using VoIP to have acceptable quality, a number of Quality of Service ("QoS") characteristics have to be met, such as minimum throughput, maximum delay, maximum delay variation, and packet loss. Service providers try to achieve these objectives by over-engineering and/or dedicating the IP network, which could be relatively expensive. On the other hand, mixing voice traffic with other traffic over the IP network, though cost effective, could significantly affect the quality of voice calls, especially during the busy hours.

There is therefore a need for a solution which guarantees the quality of a voice call on a VoIP network, once the call is launched.

SUMMARY OF THE INVENTION

It is an object of the present invention to provide guaranteed quality of service for voice communications in a voice-over-IP service.

This and other objects are achieved by a method for providing voice communication over a packetized network in which quality of service is guaranteed for voice communications. The method involves identifying one or more reserved paths within the network, such as multi-protocol label switching paths, each connecting two end points on the IP backbone. When a call is made and a voice communication is thus requested, the identified reserved path(s) is evaluated to determine whether it contains sufficient bandwidth for the requested voice communication. In some embodiments, this determination involves querying a central database for the amount of spare bandwidth still available on the reserved path and comparing it to the estimated effective bandwidth required for the call. The effective bandwidth for the call may be estimated based on the codec used for the call, the service class parameter set from the caller's user profile, the time of day, and other parameters.

A priority parameter is set for the requested voice communication. This priority parameter may be based on the service class parameter, which reflects the level or type of service to which the requesting caller has subscribed. The priority parameter is mapped to a specific Differentiated Service Code Point (DSCP) and 802.1p service class parameter.

If the reserved path is determined to contain sufficient bandwidth, the requested voice communication is transmitted over the reserved path at the set priority. The voice bits are transmitted in packets which are prioritized on the IP network using the specific DSCP and 802.1p value. The packets are classified by the transport elements in the network using the DSCP and 802.1p. If the path does not contain sufficient bandwidth, an error message is sent to inform the caller that QoS can not be guaranteed for the call, and a decision is made whether the call should proceed nevertheless.

As a result, the requested voice communication is identified and labeled as one in which quality of service has been guaranteed, and the network elements transmitting the communication in packetized form properly classify, prioritize, and filter the packets so they proceed to their destination.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
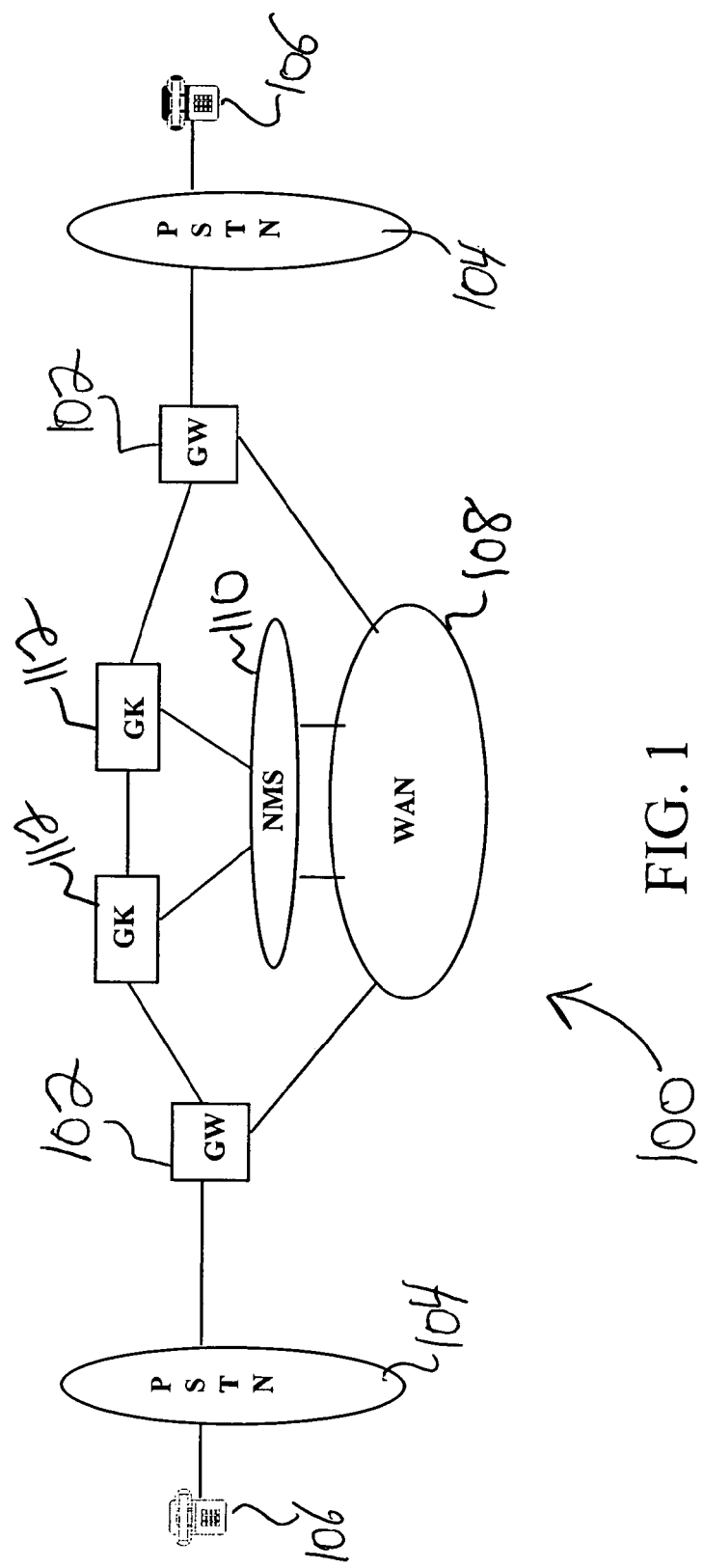
FIG. 1 is a system diagram of a VoIP network of one embodiment of the present invention.

Preferred embodiments of the present invention as now described with reference to the drawings in the Figures. FIG. 1 shows a VoIP system 100 which supports the present invention. Referring to FIG. 1, the VoIP system 100 contains gateways (GWs) 102 which receive voice communications from public switched telephone networks (PSTNs) 104 accessed through telephones 106. The GWs 102 serve as end points of a VoIP communication. Calls requested by dialing of a telephone 106 are processed by a GW 102 and converted to Internet Protocol (IP) packets for routing over the wide area network (WAN) 108, such as the Internet. The GWs support various types of connections, including analog and digital, such as T1, ISDN, or ATM connections. The GWs digitize the voice communication through transcoding to convert the PSTN format to IP and back again.

A network management system (NMS) 110 monitors the WAN 108 to keep track of the bandwidth and spare capacity on the WAN 108 for packet telephony. When a call is requested, gatekeepers (GKs) 112 access the NMS 110 to determine whether the WAN 108 can support the requested communication, and either grant or reject the requested communication. If granted, the GWs convert the voice to IP packets and route the back and forth messages across the WAN.

In some embodiments of the present invention, the VoIP system 100 uses the H.32x family of standards developed by the International Telecommunications Union (ITU). Each H.32x standard contains subsidiary standards for processing calls, aggregating channels, multiplexing media streams, coding and decoding audio streams, and performing data conferencing. One of these standards, H.323, is used for standard call control and specifies packet standards for WAN communications connected to telephony networks.

Figure 2:
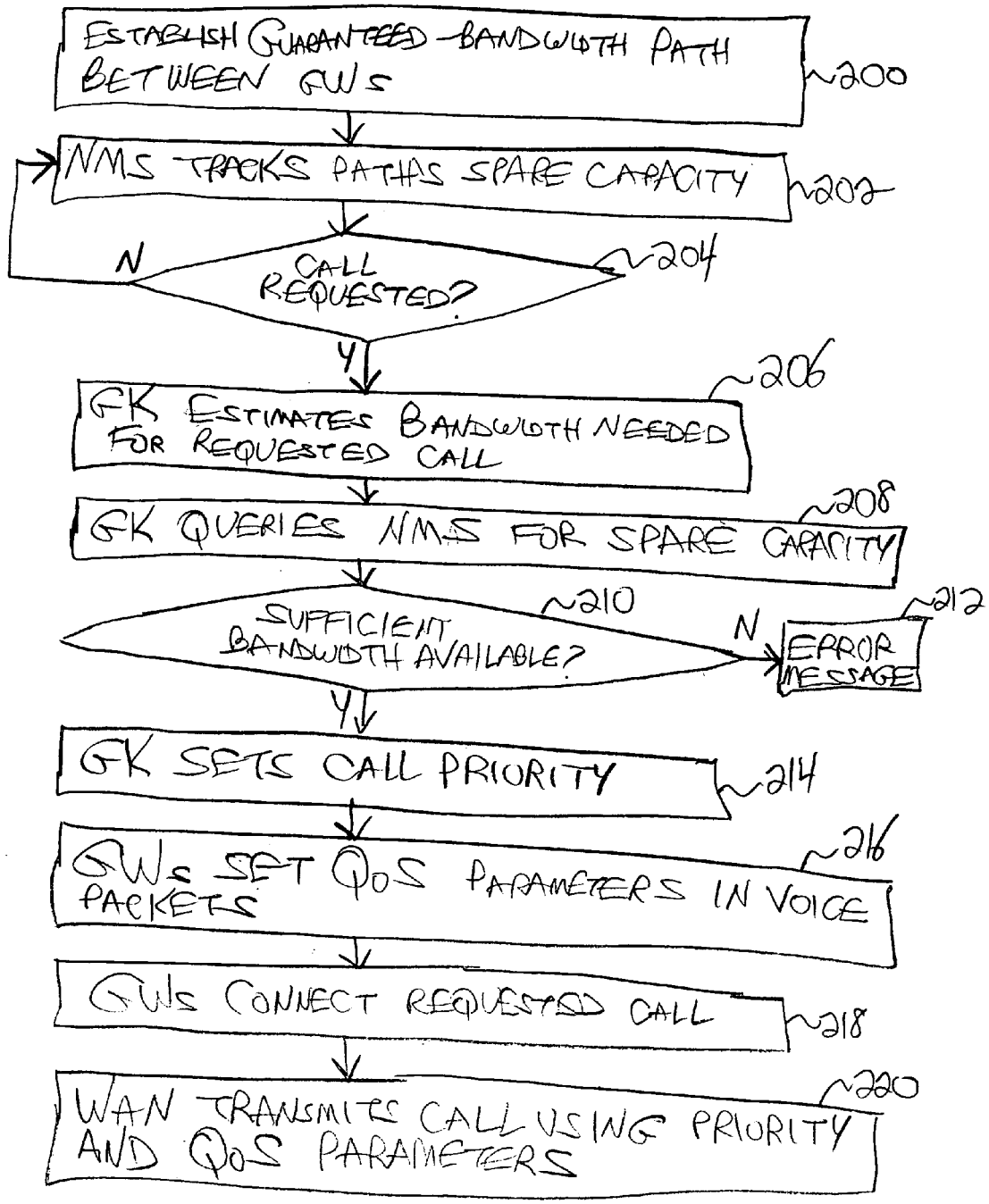
FIG. 2 is a flow chart showing a process of guaranteeing QoS for VoIP service in accordance with one embodiment of the present invention.

Referring to FIG. 2, a process for guaranteeing quality of service for VoIP service proceeds as follows. One or more guaranteed bandwidth paths are established in the WAN between any two GWs, step 200. These paths may be established using the multiprotocol label switching (MPLS) protocol defined by the Internet Engineering Task Force for routing of IP messages in a network and labeling of network paths. For each such path, the NMS tracks the path's spare capacity at any given time, step 202. The capacities of the paths are stored in a database for easy access and reference.

When a call is requested by a user, step 204, the local GW for the call informs one or both GKs of the requested call and the GK estimates the bandwidth needed for the call, step 206. The GK further queries the NMS or its associated database to determine how much spare capacity is present on one of the dedicated paths, step 208. If the path does not contain sufficient bandwidth, step 210, the GK sends an error message, step 212.

If the path contains sufficient bandwidth for the requested call, step 210, the GK decides to admit the call and sets a call priority parameter and sends it to the GWs, step 214. Using this call priority parameter, among other information, the GWs set QoS parameters in the voice packet, step 216, and connect the requested call by routing the packets over the WAN, step 218. The WAN then transmits the call packets using the QoS parameters contained in the packets, step 220.

Figure 3A:
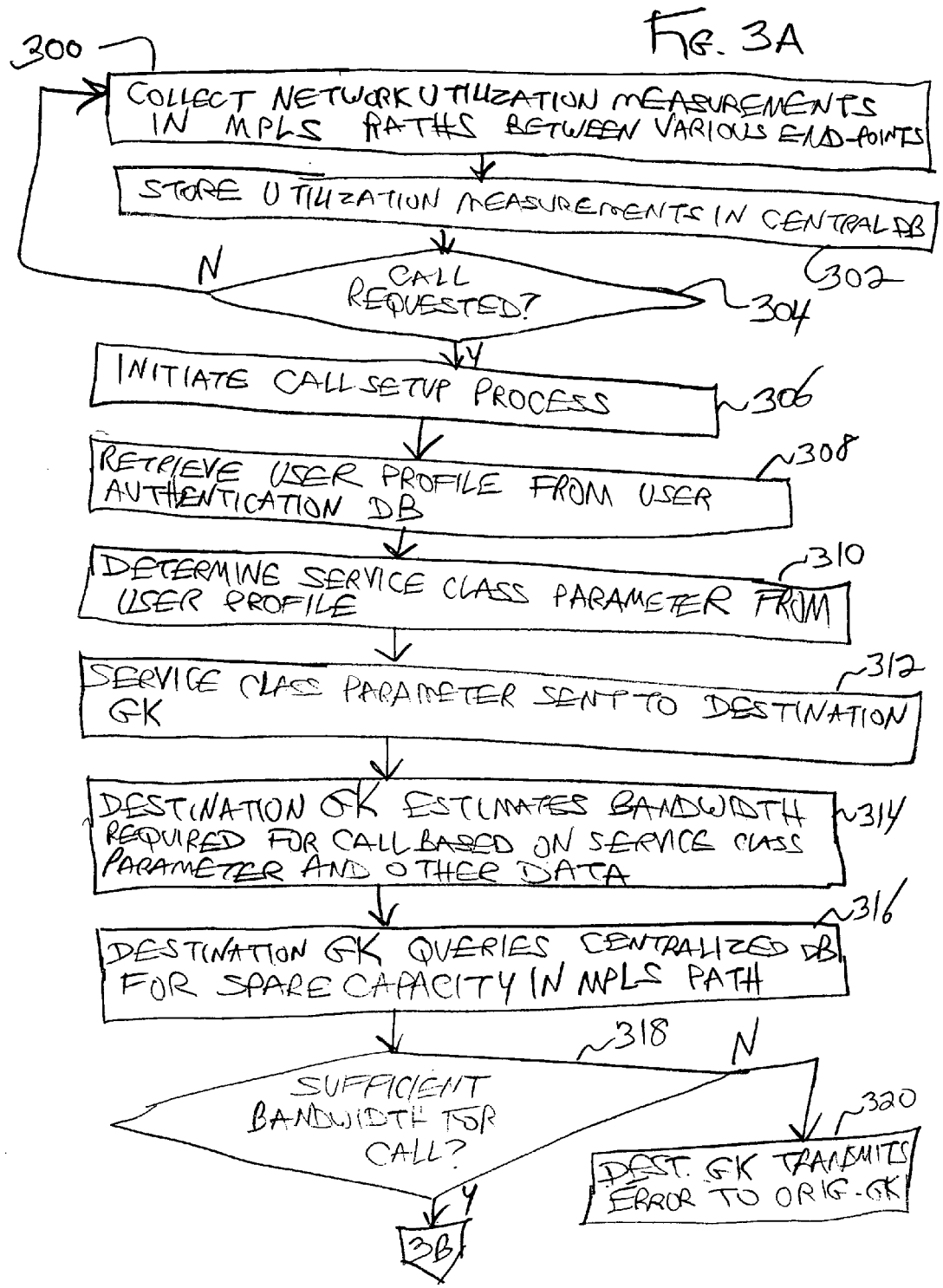
FIGS. 3A–3B contain a flow chart showing the process of FIG. 2 in greater detail in accordance with one embodiment of the present invention.

An embodiment of this process is described in more detail with reference to FIGS. 3A–3B. During the network design phase, "explicitly routed" MPLS paths are used in the IP backbone of the WAN to reserve bandwidth and network element resources in the WAN. Referring to FIG. 3A, during operation of the network, the NMS collects transport network utilization measurements for each MPLS path connecting two end-points such as GWs or other VoIP routers on the network, step 300. The NMS stores these utilization measurements in a centralized database, step 302, to maintain near real-time status information about the paths in the WAN.

When a call is requested, step 304, the GW receiving the call request initiates a H.323 call setup process, step 306. When the H.323 Setup message reaches the GK responsible for the originating GW, the GK retrieves a user profile for the caller from a user authentication and authorization database, step 308. The originating GK then determines a service class parameter for that user from the user profile, step 310. In one embodiment, the service class parameter is based on the level of service to which the caller has subscribed. Two examples of service levels, service class parameters and service definitions are as follows:

| Service: | Premium |
|---|---|
| Parameter Value: | 01 |
| Definition: | Call completion guarantee 99%; QoS guaranteed for all completed calls (except international) |
| Service: | Gold |
| Parameter Value: | 02 |
| Definition: | Call completion guarantee 95%; QoS guaranteed for all calls except during busy hours (except international) |

The originating GK sends the service class parameter to the GK responsible for and which manages call setups at the destination GW, step 312. Upon receiving the service class parameter and other call setup information, the destination GK estimates the amount of effective bandwidth required for the call, step 314, based on, among other things, the service class parameter, the co dec used, the use or no use of silence suppression, and the time of day. In one embodiment, this estimation is achieved through a look-up table to convert from these factors to bandwidth. An exemplary look-up table follows:

| Service Class | Time of Day | Codec | Silence Suppression | Bandwidth |
|---|---|---|---|---|
| 1 | Off-peak | G.711 | No | 80k |
| 1 | Peak | G.726 | No | 40k |
| 2 | Peak | G.729a | Yes | 15k |

The destination GK also queries the centralized database for the amount of spare bandwidth still or currently available in the MPLS path connecting the two GWs, step 316. Sufficient capacity is found to be available in one embodiment if the spare capacity on the MPLS path between the two GWs exceeds the estimated required bandwidth, or exceeds the bandwidth by some threshold amount. If sufficient capacity is not available, QoS cannot be guaranteed, and the destination GK returns an error message to the originating GK, step 320. The originating GK can then interact with the caller to decide on a course of action to take, e.g., to route the requested call over the network anyway, without guaranteed QoS, or to route the call over the PSTN.

Figure 3B:
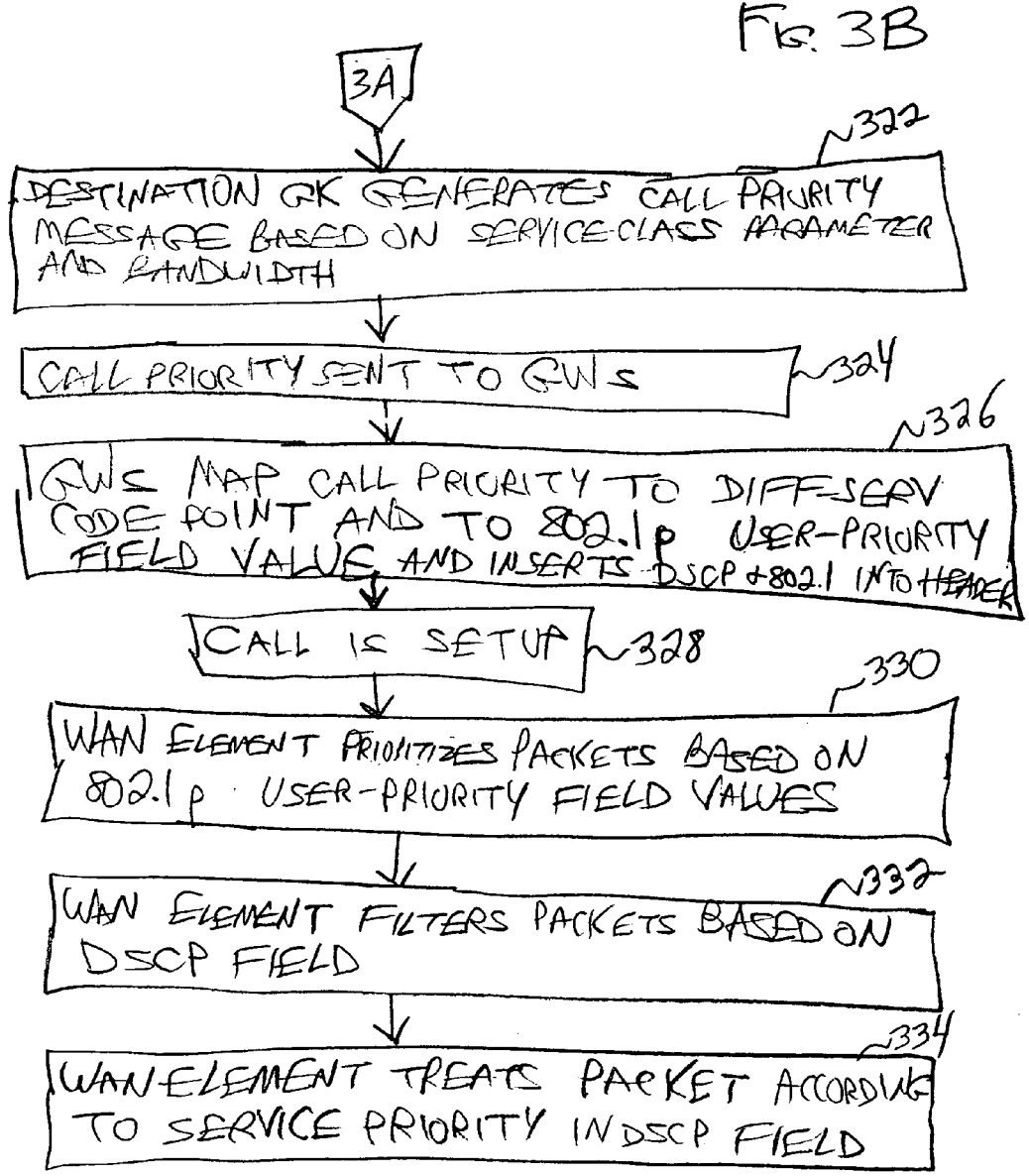

Referring to FIG. 3B, if sufficient bandwidth is available and the destination GK allows the call to proceed, the destination GK generates a call priority parameter based on the service class parameter and estimated bandwidth required. Using the examples provided above, the call priority parameters generated in one embodiment would be as follows:

| Service Class | BW | Call Priority Parameter |
|---|---|---|
| 01 | 80k | 01 |
| 01 | 40k | 02 |
| 02 | 40k | 03 |
| 02 | 15k | 04 |
| 03 | 15k | 05 |

The destination GK sends the call priority parameter in a setup message to the destination GW and to the originating GK, which then sends the parameter and other call setup data to the originating GW in a H.225 alert message, step 324. The GWs each map the call priority parameter to a specific Differentiated Service (Diffserv) code point (DSCP) using a pre-provisioned look-up table designed for this purpose, step 326. As known to those of skill in the art, Diffserv represents a set of policies developed by the IETF for the provision of QoS for IP communications by defining the behavior of network elements on a per-hop basis.

The GWs also map the call priority parameter to an 802.1p user priority field value using a pre-provisioned look-up table designed for this purpose, step 326. As known to those of skill in the art, 802.1p is an IEEE standard which specifies a method for signaling network priority on a per-frame basis. 802.1p contains a prioritization field which allows for the assignment of priorities to specific figures and provides for 8 different priorities for traffic based on a 3-bit "User Priority" field.

The originating GW takes the 802.1p and DSCP parameters and inserts them in the Ethernet header and IP header, respectively, of the voice packets. The H.323 call setup is then completed, step 328, and the call is initiated. Voice traffic starts flowing from either GW in the form of IP packets. When the packets are received by an Ethernet switch, they are prioritized using the 802.1p user-priority field values, step 330. When the packets reach a WAN router, they are filtered using the DSCP field value contained in the IP header and other IP header information such as source/destination IP addresses and source/destination UDP port numbers. The filtering process allows the packets to be mapped to the correct MPLS path and to be classified. An example of a filtered packet is:

| Source IP Address | Destination IP Address | MPLS Path |
|---|---|---|
| 135.17.1.12 | 204.127.129.2 | XYZ |

Once the packets are identified, they are treated according to the service priority depicted by the DSCP and encapsulated in an MPLS header before they are transmitted over the IP backbone, step 334.

Figure 4:
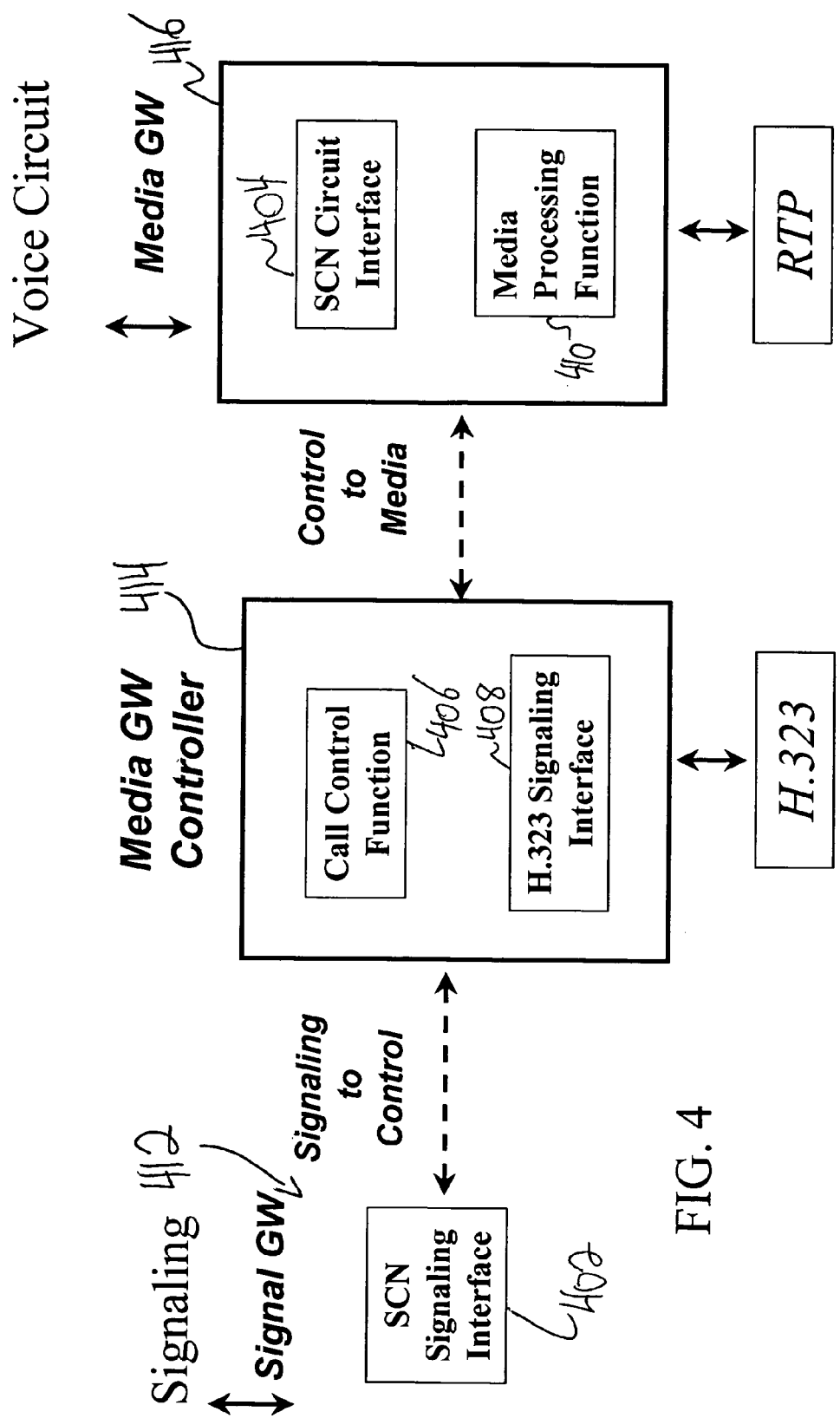
FIG. 4 is a block diagram of an exemplary embodiment of a gateway system of FIG. 1.

One embodiment of an H.323 gateway is shown functionally in FIG. 4. The GW contains a Switched Circuit Network (SCN) signaling interface 402 which communicates with a circuit network and maintains some signaling state related to the SCN connection. The GW further contains a SCN circuit interface 404 which terminates a bearer channel from the SCN and interfaces with the voice circuit such as the PSTN. A call control function 406 controls the overall state of calls and coordinates communication between entities. The SCN signaling interface 402 serves signaling messages to the call control function 406. An H.323 signaling interface 408 communicates with the packet network, serves signaling and control messages, and maintains some signaling state related to the network connection. A media processing function 410 transforms circuit content moving between the SCN circuit interface 404 to the packet network.

Figure 5:
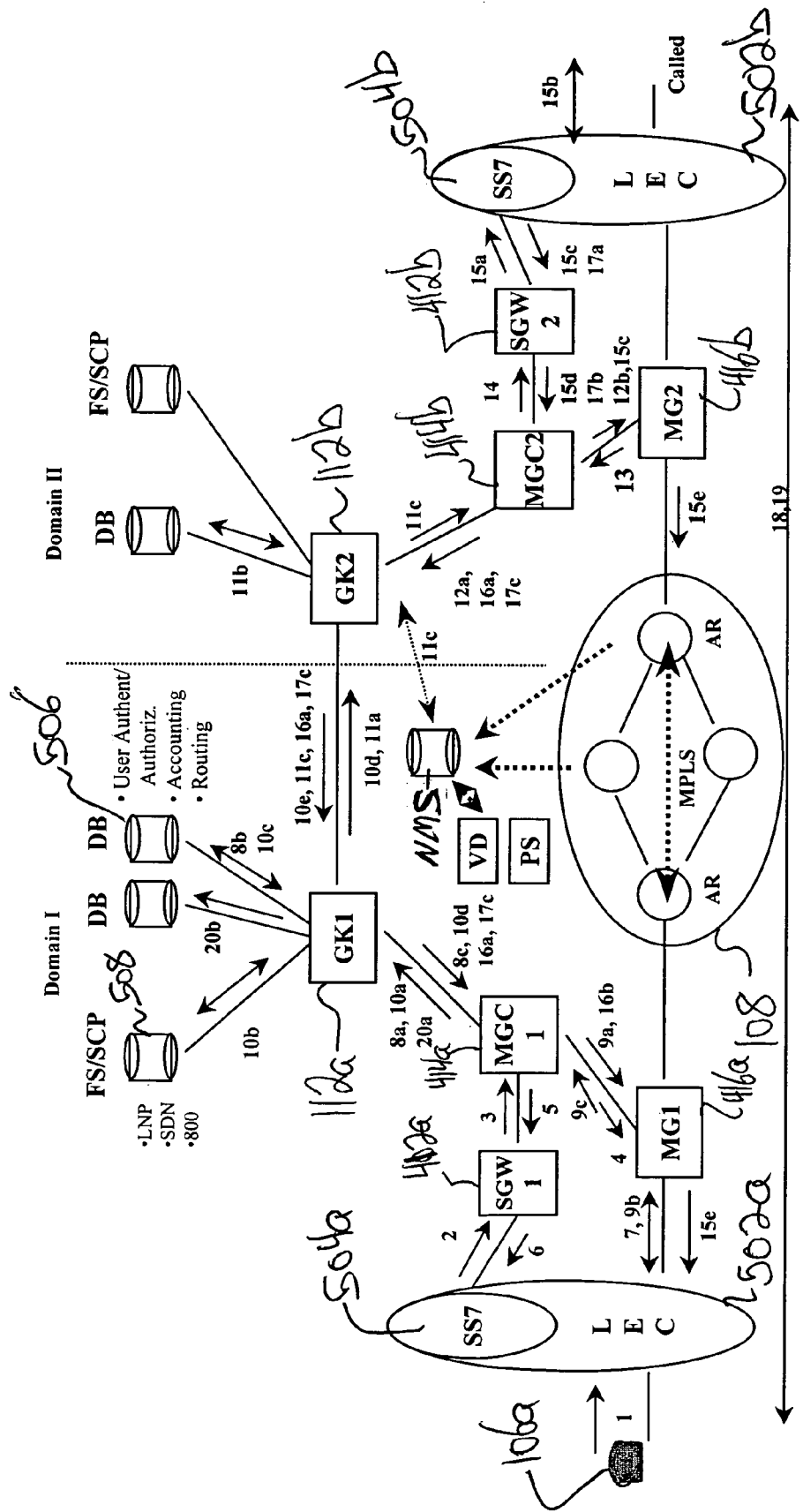
FIG. 5 is a system diagram showing an exemplary VoIP network of FIG. 1 in greater detail in accordance with one embodiment of the present invention.

As shown in FIG. 4, each GW is comprised of three functional components: a signal gateway (SGW), composed of the SCN signaling interface 402; a Media GW Controller 414 (MGC), composed of the call control function 406 and H.323 signaling interface 408; and a Media GW 416 (MG), composed of the SCN circuit interface 404 and media processing function 410. The breakdown of a GW into these functional elements helps explain an embodiment of the process of the present invention in a specific environment as shown in FIG. 5. As will be recognized by those of skill in the art, the three functional components may be implemented as two or three physical elements.

Referring then to FIG. 5, for purposes of understanding the present process better, the VoIP network may be divided functionally into two domains, I and II, representing the calling domain and the receiving domain for a given requested telephone call. Thus, as shown in FIG. 5, the two gatekeepers may be labeled GK1 112a and GK2 112b, and the GW components may similarly be labeled as SGW1 412a and SGW2 412b, MGC1 414a and MGC2 414b, and MG1 416a and MG2 416b.

Following FIG. 5, at 1 a user 106a initiates a call and dials a local GW number. The local exchange carrier (LEC) EO selects a DS0 towards MG1 to place the call on and forwards the information to the Signaling System 7 (SS7) network 504a. SS7 is a call signaling infrastructure known to those of skill in the art. At 2, the SS7 network sends an ISUP Initial Address message (IAM) which includes calling number, called number, etc. to SGW1.

At 3, SGW selects MGC1 to handle the call and sends a "Setup" message using a protocol such as ISUP/IP or Q.931. The message indicates the calling number, called number, the type of call, the facility (DS0 ID) to use, etc. At 4, MGC1 sends a "Connect" message to MG1 indicating call parameters, e.g., echo cancellation, announcements, DTMF detection, codec, DS0 ID, call progress, etc. MG1 confirms and provides the RTP port number for the Backward Channel from GW2.

At 5, MGC1 sends an ISUP Answer message (ANM) to SGW1 which instructs the EO at 6 to establish a voice path between the user and MG1, at 7. MGC1 sends the ANI in an Admission Request (ARQ) to GK1, at 8a, which looks up the User Authentication and Authorization database 506, at 8b, to validate the user and retrieve the associated profile, e.g., billing, restrictions, etc. GK1 responds with a confirmation (ACF) back to MGC1, at 8c. The ACF message includes the signaling IP address which is GK1's IP address, since this is a model by which routing is done by the GKs (GK-Routed model). At 9, MGC1 instructs MG1, at 9a, to play a welcome message and to prompt the user to enter the destination number, at 9b, which is sent back to MGC1 at 9c.

MGC1 sends an H.225 Setup message to GK1, at 10a, which queries the LNP database 508, at 10b, using, e.g., TCAP/SS7 (via MGC1 and SGW1). The received information is used to identify the destination LEC and, hence, the Domain/GK that handles the dialed number. GK1 also queries the routing DB 506, at 10c, to obtain the IP address for GK2. In other embodiments, MGC1 may also query the FS 508, e.g., for call forwarding, based on trigger points in the call flow. GK1 sends a H.225 Call Proceeding message to MGC1 and an Access Request (ARQ) to the Border Element (BE) in GK2, at 10d, which responds with an Access Confirmation (ACF) that contains the "signaling IP address," at 10e. In the GK-Routed model, the signaling IP address is that of GK2.

Based on the information contained in the User Profile, GK1 selects a Service Class parameter for the call based on the subscriber's Service Level Agreement and includes it in the H.225 Setup message that it sends to GK2, at 1a. GK2 queries the routing DB 506 to locate an available MG that can terminate the called number, at 11b, and queries a network utilization database (indicated in FIG. 5 as the NMS database) to assess if there is still capacity left on the MPLS path between GW1 and GW2, at 11c. GK2 decides, based on the called number, if an MPLS path exists between MG1 and MG2, and retrieves the MPLS path ID. If an MPLS path exists, GK2 estimates the amount of bandwidth required to guarantee the QoS requirements for the call. The calculated bandwidth is a function of: codec (G.711, G.723.1, G.729a), underlying network (IP/PPP, IP/ATM), service class, use of FEC, use of silence suppression, etc. At this stage of call setup, GK2 may not know if GW2 can support the specified codec or other bandwidth-affecting options (FEC, silence suppression, etc.). Some assumptions will have to be made or, alternatively, GK2 could assume worst case scenario (bandwidth-wise) to be on the safe side.

GK2 provides the MPLS path ID, or IP address of both GWs, to the network utilization DB and requests an estimate of the bandwidth left in the designated MPLS path. GK2 does not have to query the database for every call setup. If lots of bandwidth is available, GK2 may query the DB every N calls. As the available bandwidth decreases, N also decreases until N=1. GK2 compares the amount of bandwidth left with a pre-specified threshold and with the amount required for the call. There may be multiple thresholds. For example, a threshold could be defined to compensate for estimation error, to insure signaling traffic will always be allowed, and for some special calls, e.g., 911. If enough bandwidth is available, call setup proceeds. Otherwise, GK2 responds to GK1 with a Release Complete Message in response to the Setup request indicating the appropriate cause code. GK1 can decide to drop the call request or prompt the user to proceed anyway.

As a result of the query to the network utilization DB and the determination of available bandwidth, GK2 specifies a call priority parameter which is a function of the service class parameter, estimated BW for the call and other information, such as time-of-day. GK2 updates the Setup message before it is sent to MGC2, at 11d. Information included in the Setup message includes MG1 IP address, call priority parameter, called number, codec(s), etc.

At 12a, MGC2 sends a "Connect" message to MG2 with call options (call priority, selected codec, MG1 IP address/ port number, silence suppression indication, etc.). MG2 maps the call Priority parameter to a DiffServ Code Point (DSCP) and 802.1 p User-Priority parameter using a pre-provisioned look-up table. At 13, MG2 selects a DS0 for the outgoing call and confirms the request to MGC2 providing its transport address (IP and RTP port number) for the Forward Channel, and the DS0 facility and circuit ID for the outgoing call.

At 14, MGC2 sends a Setup message to SGW2 requesting to setup a circuit switched path to the called party. Calling and called numbers are provided in addition to the DS0 ID. SGW2 sends an ISUP Initial Address Message (IAM) to the terminating EO, at 15a, to establish the circuit switched connection between MG2 and the called party, at 15b. EO applies ringing to the called party and returns an ISUP Address Complete Message (ACM) to SGW2, at 15c, and returns an Alert message to MGC2, at 15d. MGC2 instructs MG2 to generate ringing on the already established media stream from the terminating MG2 to the originating MG1 at MGC2 sends an H.225 Alert message to MGC1, at 16a via GK2 and GK1. The message contains the RTP port for the Forward Channel and GW2 IP address, which provides MG1 with the IP address of MG2, at 16b. MGC 1 also provides MG1 with the "Call Priority" parameter which it maps to a DiffServ Code Point (DSCP) and 802.1p User Priority parameter using a pre-provisioned look-up table.

Called party goes off-hook. The terminating EO returns an ISUP Answer Message (ANM) to SGW2, at 17a, which sends a "Connect" message to MGC2, at 17b. MGC2 sends an H.225 Connect message to MGC1, at 17c, via GK2 and GK1.

At 18, the connection is now established and a voice path is available end-to-end. At 19, RTP packets transmitted by either GW will contain the DS byte in the IP header and the 802.1p parameter in the Ethernet header. The 802.1p parameter is used to prioritize the traffic on the Ethernet LAN that the MG is connected to. Once the traffic reaches the backbone Access Router (AR), it is filtered based on the DS value and other IP header fields (e.g. source/dest. IP address, protocol ID) and encapsulated in the corresponding MPLS header before it is shipped over the backbone.

When the call terminates, MGC1 sends the call accounting information to GK1, at 20a, which creates a Call Detail Record (CDR) and sends it to the accounting DB, at 20b. The CDR contains the call priority parameter for billing purposes.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for providing voice communication over a network in which data is transferred in packets, the method comprising:
   identifying a reserved path within the network;
   when a voice communication is requested, determining whether the identified reserved path contains sufficient bandwidth for the requested voice communication, comprising estimating the bandwidth required for the requested voice communication based on one or more factors;
   determining a service class parameter for the requested voice communication based on a profile of a user requesting the voice communication;
   setting a priority parameter for the requested voice communication, including mapping the priority message to a differentiated service code point field and a user priority field; and
   if the reserved path is determined to contain sufficient bandwidth, transmitting the requested voice communication over the reserved path at the set priority.

2. The method of claim 1, wherein the step of determining the service class parameter is performed based on a service level purchased by the user requesting the voice communication.

3. The method of claim 1, wherein the step of estimating the bandwidth required for the requested voice communication comprises estimating the bandwidth based on the service class parameter.

4. The method of claim 3, wherein the step of estimating the bandwidth required for the requested voice communication comprises estimating the bandwidth based further on one or more factors selected from the group consisting of a codec used in the reserved path, use of silence suppression, and time-of-day of the requested voice communication.

5. A method for providing voice communication over a network in which data is transferred in packets, the method comprising:
   identifying a reserved path within the network;
   when a voice communication is requested, determining whether the identified reserved path contains sufficient bandwidth for the requested voice communication;
   setting a priority parameter for the requested voice communication;
   sending a priority parameter message to a gateway in the network requesting the voice communication, including mapping the priority message to a differentiated service code point field and a user priority field; and
   if the reserved path is determined to contain sufficient bandwidth, transmitting the requested voice communication over the reserved path at the set priority.

6. The method of claim 5, wherein the step of transmitting the requested voice communication over the reserved path at the set priority comprises identifying the voice communication based on the differentiated service code point field and filtering the priority of the voice communication vis-à-vis other packetized communication transmitted over the path based on the user priority field value.

7. A method for providing voice communication over a network in which data is transferred in packets, the method comprising:
   identifying a reserved path within the network;
   when a voice communication is requested, determining whether the identified reserved path contains sufficient bandwidth for the requested voice communication;
   setting a priority parameter for the requested voice communications including mapping the priority message to a differentiated service code point field and a user priority field;
   requesting a voice communication through a call setup process protocol that recognizes said priority parameter; and
   if the reserved path is determined to contain sufficient bandwidth, transmitting the requested voice communication over the reserved path at the set priority.

8. A system for providing voice communication over a network in which data is transferred in packets, the system comprising:
   first means for identifying a reserved path within the network;
   second means for determining whether the identified reserved path contains sufficient bandwidth for a requested voice communication, comprising estimating means for estimating the bandwidth required for the requested voice communication based on one or more factors;
   third means for determining a service class parameter for the requested voice communication based on a profile of a user requesting the voice communication;
   fourth means for setting a priority parameter for the requested voice communication, including mapping the priority message to a differentiated service code point field and a user priority field; and
   fifth means for transmitting the requested voice communication over the reserved path at the set priority if the reserved path is determined to contain sufficient bandwidth.

9. The system of claim 8, wherein the means for estimating the bandwidth required for the requested voice communication comprises means for estimating the bandwidth based on the service class parameter.

10. The system of claim 9, wherein the means for estimating the bandwidth required for the requested voice communication comprises means for estimating the bandwidth based further on one or more factors selected from the group consisting of a codec used in the reserved path, use of silence suppression, and time-of-day of the requested voice communication.

11. A system for providing voice communication over a network in which data is transferred in packets, the system comprising:
   first means for identifying a reserved path within the network;
   second means for determining whether the identified reserved path contains sufficient bandwidth for a requested voice communication;
   third means for setting a priority parameter for the requested voice communication;
   fourth means for sending a priority parameter message to a gateway in the network requesting the voice communication, including mapping the priority message to a differentiated service code point field and a user priority field; and
   fifth means for transmitting the requested voice communication over the reserved path at the set priority if the reserved path is determined to contain sufficient bandwidth.

\* \* \* \* \*